(12) United States Patent
Shimizu

(10) Patent No.: US 7,657,187 B2
(45) Date of Patent: Feb. 2, 2010

(54) OPTICAL TRANSMISSION APPARATUS AND OPTICAL TRANSMISSION CONTROL METHOD FOR WAVELENGTH-DIVISION-MULTIPLEXED OPTICAL SIGNAL

(75) Inventor: Katsuhiko Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 511 days.

(21) Appl. No.: 11/369,956

(22) Filed: Mar. 8, 2006

(65) Prior Publication Data

US 2006/0210272 A1 Sep. 21, 2006

(30) Foreign Application Priority Data

Mar. 9, 2005 (JP) ............................. 2005-064719

(51) Int. Cl.
*H04B 10/02* (2006.01)
(52) U.S. Cl. ................... 398/177; 398/181; 398/38; 398/33; 398/37; 359/341.41; 359/337.1; 359/341.42
(58) Field of Classification Search ................ 398/173, 398/175, 177, 180, 181, 147, 157, 158, 159, 398/160, 162, 33, 38, 30, 31, 37, 79, 81, 398/91, 92, 34, 94; 359/337, 341, 341.41, 359/341.42, 349, 334, 337.1
See application file for complete search history.

(56) References Cited

U.S. PATENT DOCUMENTS

| 6,144,485 | A | 11/2000 | Sugaya et al. |
| 6,157,481 | A | 12/2000 | Sugaya et al. |
| 6,198,572 | B1 | 3/2001 | Sugaya et al. |
| 6,466,348 | B1 * | 10/2002 | Izumi ......................... 398/177 |
| 6,819,875 | B2 * | 11/2004 | Touma ........................ 398/177 |
| 6,903,324 | B2 * | 6/2005 | Tomofuji et al. ...... 250/214 LA |
| 7,248,799 | B2 * | 7/2007 | Faure et al. .................... 398/38 |
| 2001/0017729 | A1 * | 8/2001 | Sugaya et al. .......... 359/341.41 |

FOREIGN PATENT DOCUMENTS

| JP | 9-219696 A | 8/1997 |
| JP | 10-51057 A | 2/1998 |

* cited by examiner

*Primary Examiner*—Hanh Phan
(74) *Attorney, Agent, or Firm*—Sughrue Mion, PLLC (57) ABSTRACT

An optical transmission apparatus for amplifying and relaying a wavelength-division-multiplexed optical signal includes (1) a variation-detecting unit which detects varying speed of input power of the wavelength-division-multiplexed optical signal and compares the varying speed with a set value, (2) an optical amplifying unit which amplifies the wavelength-division-multiplexed optical signal at a fixed amount of amplification, (3) a variable optical attenuating unit which variably attenuates the wavelength-division-multiplexed optical signal, (4) and a controlling unit which controls attenuation amount of the variable optical attenuating unit in accordance with the varying speed.

37 Claims, 5 Drawing Sheets

OPTICAL TRANSMISSION APPARATUS AND OPTICAL TRANSMISSION CONTROL METHOD FOR WAVELENGTH-DIVISION-MULTIPLEXED OPTICAL SIGNAL

BACKGROUND OF THE INVENTION

1. Field of the Invention

The present invention relates to an optical transmission apparatus and an optical transmission control method, and more particularly to an optical transmission apparatus and an optical transmission control method, for amplifying and transmitting a wavelength-division-multiplexed optical signal.

2. Description of the Related Art

In a wavelength-division-multiplexing optical transmission system, an optical signal with each wavelength needs to be kept at constant power in order to maintain high-quality transmission characteristics. There are mainly two factors in a power variation of a wavelength-division-multiplexed optical signal, which factors are (1) a change in the number of wavelengths and (2) a change in the transmission loss. When the number of wavelengths is changed, the sum power of all optical signals is changed, but the power of the optical signal with each wavelength is not changed. On the other hand, when the transmission loss is changed, both the sum power of all optical signals and the power of the optical signal with each wavelength are changed. Because of these differences, upon the occurrence of the power variation, it is necessary to change the control of the transmitted optical signal. Specifically, when the number of wavelengths is changed, the power of the optical signal with each wavelength is not changed, and hence, the power of the optical signal with each wavelength need not be changed. On the other hand, when the transmission loss is changed, the power of the optical signal with each wavelength is changed, and hence, the power of the optical signal with each wavelength needs to be changed.

In recent years, the number of cases where the optical repeating office is provided with a function for adding/dropping an optical signal with an arbitrary wavelength has been increasing in the wavelength-division-multiplexing optical transmission system. This makes it possible to easily increase or decrease the number of the transmitted wavelengths. Here, the assumption is made that a power variation is caused in a wavelength-division-multiplexed optical signal inputted in an optical repeating office. In this case, it is necessary to detect whether the power variation is caused by the change in the number of wavelengths or by the variation in the transmission loss, in order to maintain high-Quality transmission characteristics. A technique related to this case is disclosed in Japanese Patent Laid-Open No. 9-219696.

The optical amplifying apparatus herein disclosed amplifies each signal within the wavelength-division-multiplexed optical signal all together. In the amplifying operation, the optical amplifying apparatus controls the average value of optical signal levels of each wavelength (channel) to be constant against the change in the number of inputted wavelengths (channels) and the variation in the level of inputted optical signals. Specifically, the optical amplifying apparatus is configured so that two optical fiber amplifiers which perform automatic gain control (AGC) are cascade-connected and a variable optical attenuator is inserted between the optical fiber amplifiers. Thus, the optical amplifying apparatus detects the optical signal levels and the wavelength-division-multiplexed number (the number of channels). Further, the optical amplifying apparatus obtains the average value of the optical signal levels of each wavelength (each channel) and controls an attenuation amount of the variable optical attenuator so as to make the average value remain constant. The detection of the wavelength-division-multiplexed number is performed by a wavelength-division-multiplexed number detecting circuit. The calculation of the average value of optical signal levels is performed by an average level detecting circuit.

In this related technique, the wavelength-division-multiplexed number detecting circuit needs to be provided in order to monitor the wavelength-division-multiplexed number. The wavelength-division-multiplexed number detecting circuit demultiplexes a wavelength-division-multiplexed optical signal to each wavelength and then detects the presence or absence of each wavelength. Further, in this related technique, the average level detecting circuit also needs to be provided in order to obtain the average value of optical signal levels of each wavelength. This related technique needs such expensive circuits, and hence has a problem that the cost is high.

Thus, there is a method in which information on the number of wavelengths is received by a supervisory signal for transmission line (SV light). A technique related to this method is disclosed in Japanese Patent Laid-Open No. 10-51057 (patent family: U.S. Pat. No. 6,157,481, U.S. Pat. No. 6,198,572, and U.S. Pat. No. 6,144,485). In this related technique, a control signal which notifies a change in the number of channels (the number of wavelengths), is multiplexed onto the wavelength-division-multiplexed optical signal and transmitted. Then, the optical amplifying apparatus extracts the transmitted control signal and thereby receives the change in the number of channels of the optical signals. However, it takes much time until the optical amplifying apparatus to receive the control signal from the time when the control signal is transmitted from an apparatus in the preceding stage. For example, it takes about several seconds, and when the time period is long, it takes about several tens seconds. Therefore, a delay time is generated between the time when the number of wavelengths of optical signals is changed and the time when the information on the changed number of wavelengths is received by the optical amplifying apparatus. During this period of time, proper control is not performed, and hence, the output power per channel (wavelength) may be deviated from a target value so as to cause deterioration in the transmission quality. Therefore, this related technique, in which timely control cannot be performed, has a problem in reliability.

SUMMARY OF THE INVENTION

An exemplary feature according to the present invention is to provide an optical transmission apparatus and an optical transmission control method which are capable of performing proper power control by a simple configuration and control operation against each of the power variation in the inputted optical signal, which are caused by the change in the number of wavelengths or by the variation in the transmission loss.

An optical transmission apparatus according to the present invention for amplifying and relaying a wavelength-division-multiplexed optical signal includes (1) a variation-detecting unit which detects varying speed of input power of the wavelength-division-multiplexed optical signal and compares the varying speed with a set value, (2) an optical amplifying unit which amplifies the wavelength-division-multiplexed optical signal at a fixed amount of amplification, (3) a variable optical attenuating unit which variably attenuates the wavelength-division-multiplexed optical signal, (4) and a controlling unit which controls attenuation amount of the variable optical attenuating unit in accordance with the varying speed.

An optical transmission control method to the present invention of amplifying and relaying a wavelength-division -multiplexed optical signal includes (1) detecting varying speed of input power of the wavelength-division-multiplexed optical signal, (2) comparing the varying speed with a set value, (3) amplifying the wavelength-division-multiplexed optical signal at a fixed amount of amplification, (4) and attenuating the wavelength-division-multiplexed optical signal constantly or variably in accordance with the varying speed.

As described above, upon the occurrence of power variation in the inputted optical signal, the optical transmission apparatus and the optical transmission control method according to the present invention are capable of timely determining whether the power variation is caused by the change in the number of wavelengths or by the variation in the transmission loss, by means of a simple configuration and control operation. Therefore, the present invention has an effect of making it possible to perform power control which is suitable for each of the changes in the number of wavelengths and in the transmission loss.

BRIEF DESCRIPTION OF THE DRAWINGS

The exemplary aspects, features and advantages of the present invention will become more apparent from the following detailed description when taken in conjunction with the accompanying drawings wherein.

DETAILED DESCRIPTION OF THE PREFERRED EMBODIMENTS

In the following, preferred embodiments for carrying out the present invention are described in more detail with reference to the accompanying drawings. The embodiments described below are shown as particular examples in order to provide a better understanding of the present invention, and the scope of the present invention is not limited only to these embodiments.

Note that "optical transmission apparatus", "variation -detecting unit", "optical amplifying unit" and "variable optical attenuating unit" described in the following claims are embodied to be shown as "optical amplifying apparatus", "input-optical-power variation-detecting unit", "optical amplifying medium", and "variable optical attenuator". The "input-optical-power variation-detecting unit" is further embodied to be shown as a configuration suitably provided with an "analog/digital (AD) converter", a "registering unit", a "comparing unit", and the like. However, these are shown as examples for the sake of clarity and ease of understanding, and the scope of the invention is not limited only to these examples.

In the following, a first embodiment according to the present invention is described with reference to the accompanying drawings.

Figure 1:
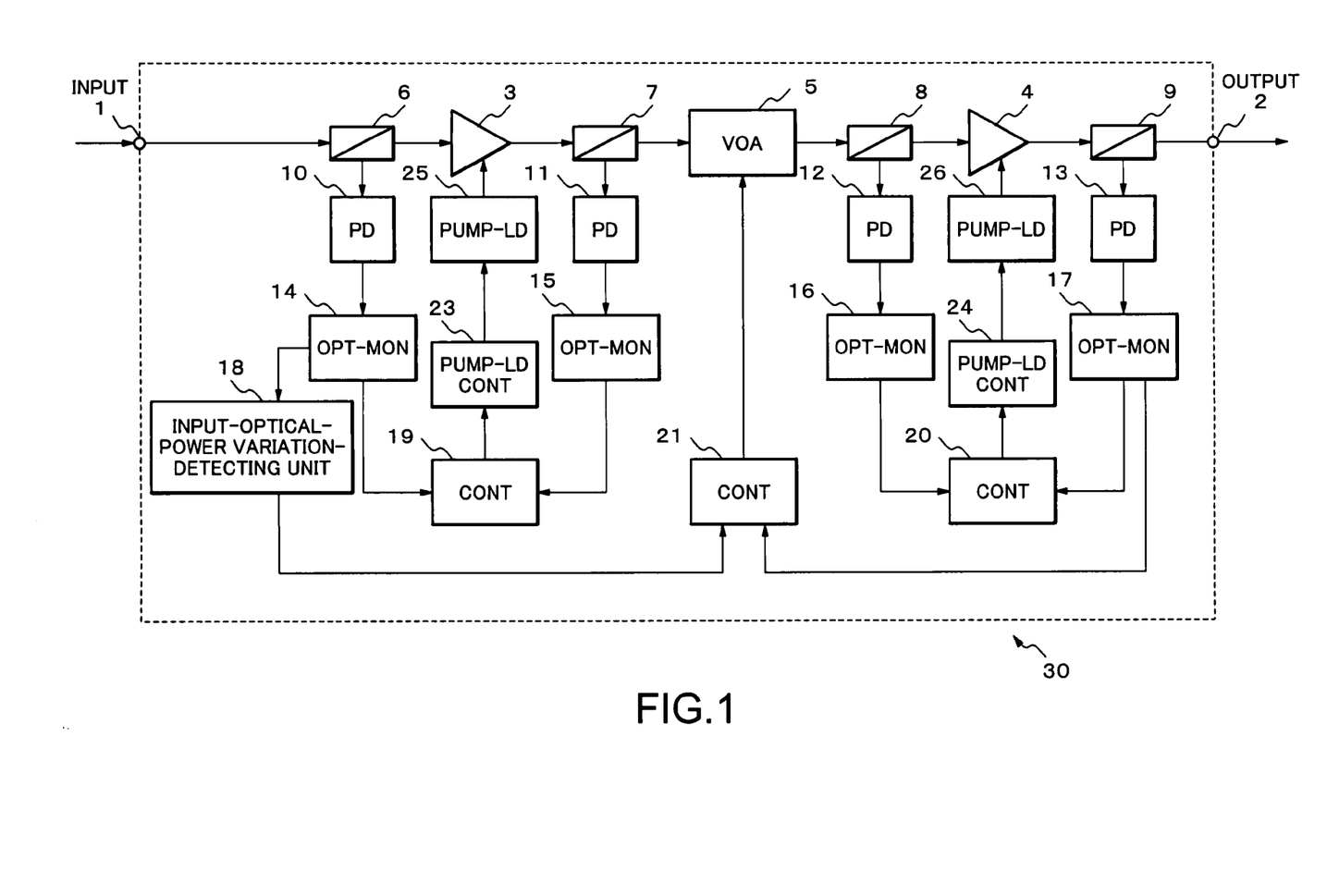
FIG. 1 is a functional block diagram in a first embodiment according to the present invention.

FIG. 1 is a functional block diagram in the first embodiment according to the present invention. The optical amplifying apparatus 30 includes an input port 1, an output port 2, optical amplifying media (for example, erbium-doped -fibers (EDFs) and the like) 3, 4, a variable optical attenuator (hereinafter referred to as VOA) 5, optical branching couplers (hereinafter referred to as CPLs) 6 to 9, photoelectric converters (e.g. Photodiode, hereinafter referred to as PDs) 10 to 13, optical power monitoring units (Opt-MONs) 14 to 17, and an input-optical-power variation-detecting unit 18. Further, the optical amplifying apparatus 30 includes control units (CONTs) 19 to 21, controlling units for pumping light source (Pump-LD CONTs) 23, 24 and pumping light sources (Pump-LDs) 25, 26.

To the input port 1, a wavelength-division-multiplexed optical signal (hereinafter referred to as WDM signal) from an up-streaming transmission line is inputted. From the output port 2, an amplified WDM signal is outputted to a down-streaming transmission line. The optical amplifying media 3, 4 are cascade-connected, and the VOA 5 is inserted between the optical amplifying media. Note that the VOA 5 may be inserted in the preceding stage of the optical amplifying medium 3 or in the subsequent stage of the optical amplifying medium 4. The VOA5 is capable of attenuating the WDM signal at a variable value. The optical amplifying media 3, 4 amplify the WDM signal by automatic gain control (AGC). Therefore, the input/output power of the optical amplifying media 3, 4 is monitored and controlled so as to make the gain of the optical amplifying media 3, 4 remain constant. Specifically, the input power and the output power of the optical amplifying medium 3 are branched by the CPLs 6, 7, respectively. The PDs 10, 11 convert the optical power branched by the CPLs 6, 7 into current values. The optical power monitoring units 14, 15 monitor the current values of the PDs 10, 11, and then supply the monitor values to the controlling unit 19. The controlling unit 19 generates a control signal so as to make the gain of the optical amplifying medium 3 remain constant, and then supplies the control signal to the controlling unit for pumping light source 23. The controlling units for pumping light source 23 performs the gain control of the optical amplifying medium 3 by controlling the output power of the pumping light source 25. Similarly to the optical amplifying medium 3, the optical amplifying medium 4 is subjected to the gain control by the CPLs 8, 9, the PDs 12, 13, the optical power monitoring units 16, 17, the controlling unit 20, the controlling unit for pumping light source 24, and the pumping light source 26. Note that functions of each device and unit are the same as those in the case of the optical amplifying medium 3, and hence, the explanation thereof is omitted.

The input-optical-power variation-detecting unit 18 detects a variation in the input-optical-power by using the output of the optical power monitoring unit 14 as an input. The controlling unit 21 generates a control signal for the VOA 5 on the basis of both the input-optical-power variation -detected output from the input-optical-power variation -detecting unit 18 and of the monitored output from the optical power monitoring unit 17. Specifically, the controlling unit 21 determines a cause of the optical power variation on the basis of the input-optical-power varying speed detected by the input-optical-power variation-detecting unit 18. Then, the controlling unit 21 controls the attenuation amount of the VOA 5 so as to make the output-optical-power of the optical amplifying apparatus which is monitored by the optical power monitoring unit 17 reach a target value (set value).

In the following, operation of the first embodiment according to the present invention is described.

In a system adding/dropping an optical signal with an arbitrary wavelength, in addition to the case where the transmission loss is changed, the optical power inputted into the optical amplifying apparatus is also changed in the case where the number of wavelengths is changed. It is preferred to change the control of the VOA between the case where the transmission loss is changed and the case where the number of wavelengths is changed. That is, when the number of wavelengths is changed, there is no change in the input-optical-power per channel (wavelength). For this reason, in the VOA 5, the attenuation amount is not changed and kept at a fixed value. With such control operation, the output per channel in the optical amplifying apparatus 30 can be kept constant. On the other hand, when the transmission loss is changed, the input-optical-power per channel is changed. For this reason, the controlling unit 21 changes the attenuation amount of the VOA 5 so as to make the variation of the transmission loss cancelled. Specifically, when the transmission loss is increased, the controlling unit 21 decreases the attenuation amount of the VOA 5, and on the contrary, when the transmission loss is decreased, the controlling unit 21 increases the attenuation amount of the VOA 5. With such control operation, the output per channel in the optical amplifying apparatus 30 can be kept constant. Note that the amplification gain of the optical amplifying media 3, 4 are preferably controlled to be fixed at a value by which the flatness characteristic of the profile of the amplification gain is optimized.

In order to meet the above requirements, the first embodiment according to the present invention operates as described below.

In FIG. 1, the WDM signal transmitted through the transmission line is inputted to the optical amplifying apparatus 30 via the input port 1. The inputted WDM signal is amplified by the optical amplifying medium 3, is once attenuated by the VOA 5, and is amplified again by the optical amplifying medium 4, via plural CPLs 6, 7, 8, 9. In this way, the amplified WDM signal is outputted from the output port 2 to the outside of the optical amplifying apparatus 30. Note that as described above, the optical amplifying medium 3 is monitored and controlled so that its amplification gain remains constant. Similarly, the optical amplifying medium 4 is also monitored and controlled so that its amplification gain remains constant.

Next, the control of the VOA 5 is described in detail. The optical power of the WDM signal which is branched into the PD 10 by the CPL 6 is converted into a current value. Then, the current value is outputted to the optical power monitoring unit 14, in which the optical power inputted to the optical amplifying apparatus 30 is monitored. The monitor value is sent to the controlling unit 19 as well as to the input-optical-power variation-detecting unit 18, in which the varying speed of the input-optical-power is detected. Then, the controlling unit 21 selectively controls the VOA 5 on the basis of the detection value. Specifically, when the varying speed is higher than a fixed speed, the variation is determined to be the variation of the input-optical-power caused by the change in the number of wavelengths. Then, the controlling unit 21 makes the attenuation amount of the VOA 5 remain as it is, without changing the attenuation amount. On the other hand, when the varying speed is equal to or lower than the fixed speed, the variation is determined to be the variation of the input-optical-power caused by the transmission loss. Then, the controlling unit 21 controls the attenuation amount of the VOA 5 on the basis of the information from the optical power monitoring unit 17, so as to make the output-optical-power in the output port 2 become the value before the variation. Specifically, when the input-optical-power is decreased, the controlling unit 21 decreases the attenuation amount of the VOA 5, and on the other hand, when the input-optical-power is increased, the controlling unit 21 increases the attenuation amount of the VOA 5. With such control operation, the output per channel of the optical amplifying apparatus 30 is kept constant.

The change in the number of wavelengths may be determined on the basis of the level of the optical power variation within a detection time period which is set. The optical power variation (power decrease) at the time of removing an optical fiber occurs within a time period of approximately 1 to 100 ms (milliseconds). Further, the optical power variation (power decrease) at the time of shutdown or a fault of an optical transmitter occurs within a time period of the order of several to several tens μs, and the rising time period of the transmitter (power increase) is on the order of 1 ms.

Therefore, the variation detection time period is set to several hundreds ms or less. Further, in order to improve the decision accuracy, the variation detection time period is preferably set to 100 ms or less. Then, the optical power variation within the set detection time period is compared with the set decision threshold (set value) of the optical power variation. As an example of the decision threshold, an optical power variation within the set detection time period more than 1 dB (decibel) is set as the change in the number of wavelengths, and the optical power variation equal to or less than 1 dB is set as the variation in the transmission loss. Note that needless to say, the decision threshold within the set detection time period is not limited to the above described value of 1 dB, and can be properly set so as to correspond to the transmission system.

In addition, the input-optical-power variation-detecting unit 18 may be constituted by hardware or software. Note that the input-optical-power variation-detecting unit 18, when realized by software, has an advantage that the setting can be flexibly changed.

In the following, there is shown an example in which the optical power monitoring unit 14 and the input-optical-power variation-detecting unit 18 are constituted by software. First, a current value is taken from the PD 10 into the optical power monitoring unit 14, and converted into a voltage value, which is subjected to the analog/digital (AD) conversion. Further, the input-optical-power in the input port 1 of the optical amplifying apparatus 30 is calculated by the optical power monitoring unit 14 on the basis of the photoelectric conversion efficiency value of the PD 10, the conversion formula between electric current and voltage of the optical power monitoring unit 14 and the like. Specifically, the current from the PD 10 is current-voltage converted by an operational amplifier and a logarithmic amplifier (LOG AMP) and the like. Further, the converted voltage value is converted to a digital value by an AD converter. Then, the input-optical-power is calculated from the digital value by a processor (CPU: Central Processing Unit, DSP: Digital Signal Processing, and the like). Next, the input-optical-power variation-detecting unit 18 successively stores the input-optical-power calculated by the optical power monitoring unit 14 in a register at a fixed period. Then, the input-optical-power variation-detecting unit 18 calculates the difference between the input-optical-power before a set time period (for example, before 100 ms) and the present input-optical-power, and then compares the difference with the decision threshold. Finally, the comparison result is notified to the controlling unit 21.

Note that the input-optical-power variation-detecting unit 18 may use, as a hardware, a differential detector provided with a circuit having a differentiating function in order to detect the varying speed. The differential detector also has the same function as that of the above described software.

Figure 2:
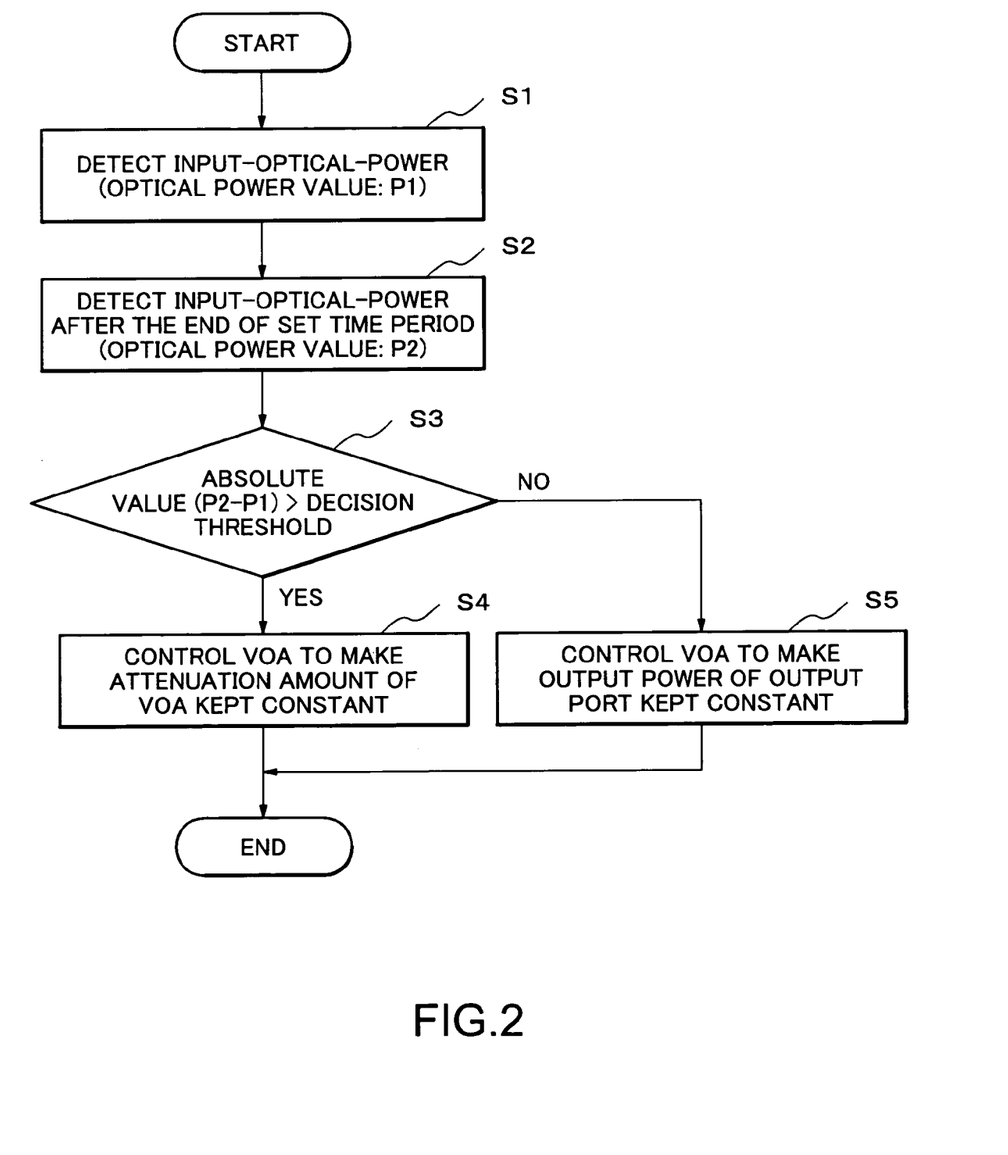
FIG. 2 is a flow chart showing an example of a control operation in the first embodiment according to the present invention.

Next, the control operation of the first embodiment according to the present invention is explained by means of a flow chart. FIG. 2 is a flow chart showing an example of the control operation of the first embodiment according to the present invention. First, the input-optical-power is detected in the input-optical-power variation-detecting unit 18 ("optical power value: P1" in step S1). Next, the input -optical-power after the end of the set time period (after the end of the variation detection time period) is detected ("optical power value: P2" in step S2). The varying speed is calculated on the basis of these detection results. Substantially, the absolute value (P2-P1) within the variation detection time period is calculated. Then, when the variation of the input-optical-power is larger than the decision threshold (set value) of the set optical power variation: "YES (varying speed is high)", the process proceeds to step S4. In step S4, the controlling unit 21 controls the VOA 5 to make the attenuation amount of the VOA 5 remain unchanged and constant. In other words, the attenuation amount of the VOA is controlled to a same value before and after the optical power variation. On the other hand, when the variation of the input-optical-power is not larger than the decision threshold: "NO (varying speed is low)", the process proceeds to step S5. In step S5, the controlling unit 21 controls the VOA to make the output-optical-power of the output port in the optical power monitoring unit 17 remain constant. In other words, the attenuation amount of the VOA 5 is controlled to be different before and after the optical power variation, so as to make the output-optical-power of the optical amplifying apparatus remain constant. More specifically, in order to cancel the optical power variation, when the optical power variation value (P2-P1) is positive (the transmission loss is decreased), the attenuation amount of the VOA 5 is increased, and when the optical power variation value (P2-P1) is negative (the transmission loss is increased), the attenuation amount of the VOA 5 is decreased. Thereby, the output-optical-power after the amplification is controlled to remain the value before the occurrence of the optical power variation.

Figure 3:
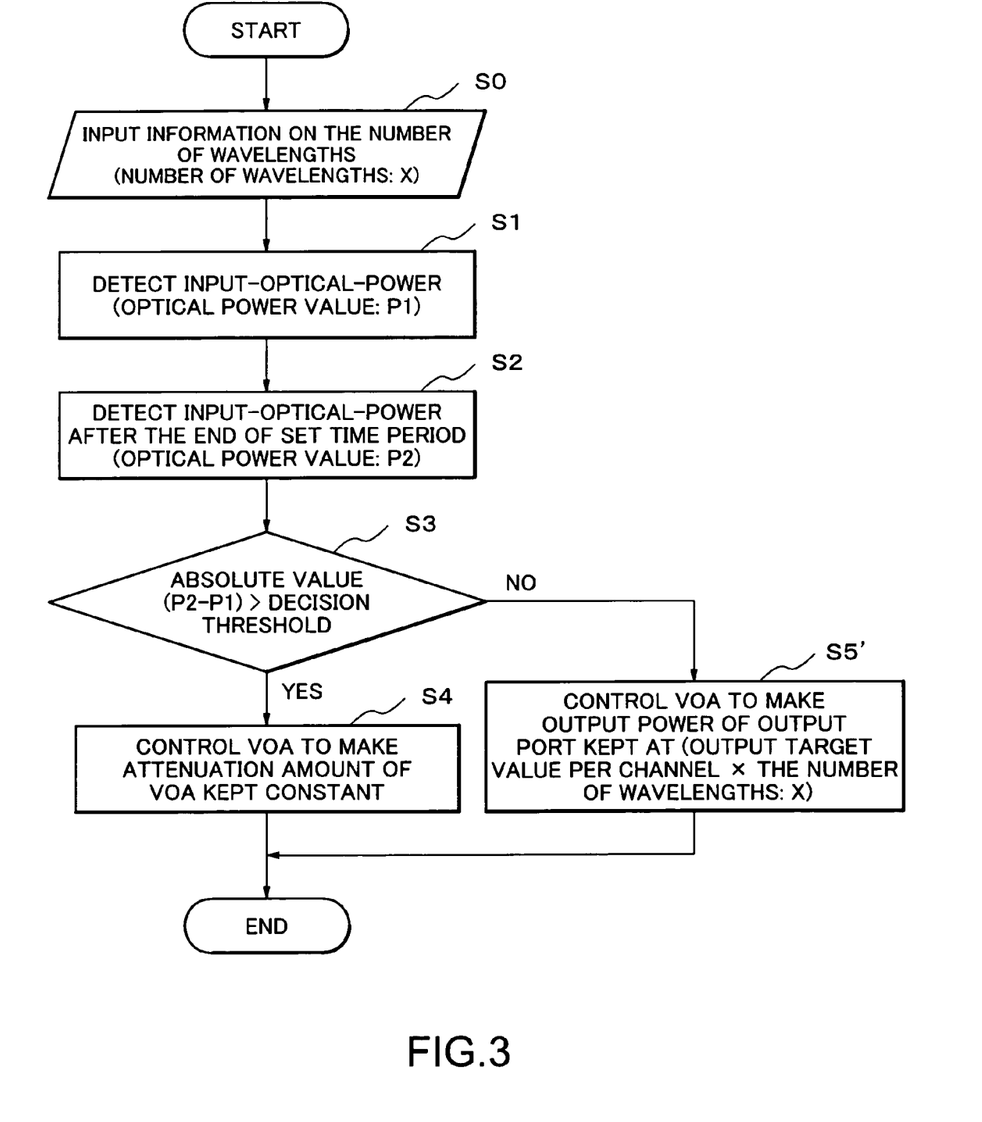
FIG. 3 is a flow chart showing another example of the control operation in the first embodiment according to the present invention.

FIG. 3 is a flow chart showing another example of the control operation. This example is different from the control operation in FIG. 2 in that the information on the number of wavelengths is inputted by some kind of means at the time of starting the operation and is used. Note that steps equivalent to those in FIG. 2 are denoted by the same reference characters and the explanation thereof is omitted.

In this example, contrivance is further provided for the following points. The optical amplifying apparatus 30 receives the information on the number of wavelengths beforehand with some kind of means (manual input and the like) (step S0). Then, in step S3, when the optical power variation "absolute value (P2-P1)" is not larger than the decision threshold: "NO" (optical power varying speed is low), the process proceeds to step S5'. In step S5', the controlling unit 21 does not "control the VOA so as to make the output power of the output port remain constant", but "controls the VOA so as to make the output power of the output port reach the power of (the target value per channel×the number of wavelengths)". In this way, the control may be performed by using the number of wavelengths.

As described above, the present embodiment has the following effects.

First, the difference between the variation of the input -optical-power when the number of wavelengths is changed and the variation of the input-optical-power when the transmission loss is changed, can be determined by a simple configuration and method. As a result, the control can be properly changed against these variations so that the output control of the variable optical attenuator can be properly performed.

Second, the determination can be performed within a very short time period (for example, about several hundreds ms, and further 100 ms or less), so that the high speed control of the variable optical attenuator can be effected. Thereby, the output per channel can be kept constant without a time lag, as a result of which a highly reliable system can be constituted.

Third, in the case where the determination processing of the optical power varying speed is performed by software, an existing circuit arrangement in the apparatus can also be used so that the determination processing can be realized at a low cost without adding any additional circuit.

Figure 4:
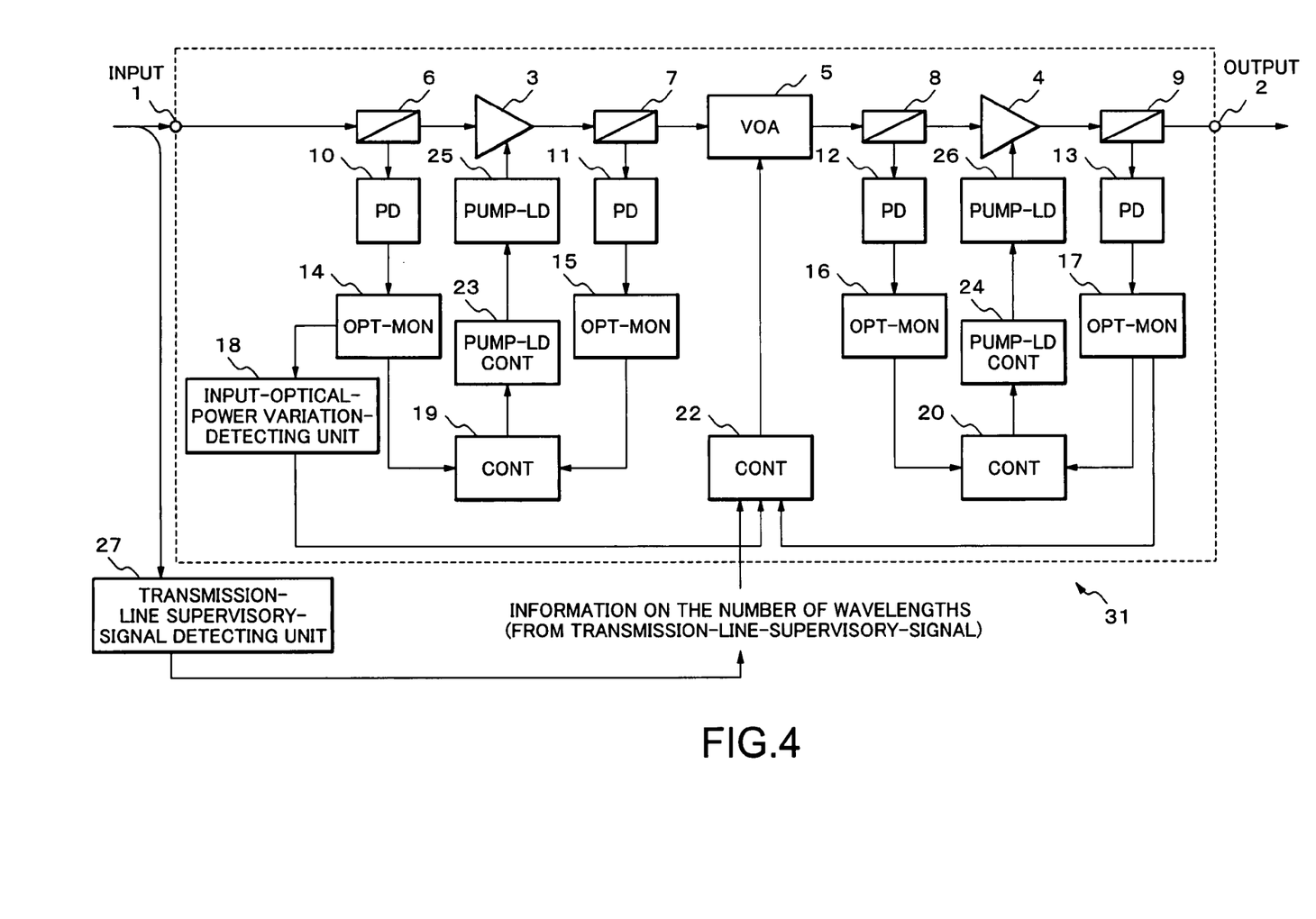
FIG. 4 is a functional block diagram in a second embodiment according to the present invention.

FIG. 4 is a functional block diagram in a second embodiment according to the present invention. A configuration of an optical amplifying apparatus 31 in the second embodiment according to the present invention is different from the configuration of the first embodiment in that a controlling unit 22 receives the information on the number of wavelengths on the basis of the supervisory signal for transmission line. Note that configuration blocks equivalent to those in FIG. 1 are denoted by the same reference numerals and the explanation thereof is omitted.

The controlling unit 22 receives the information on the number of wavelengths periodically in addition to performing the function of the controlling unit 21 of the first embodiment. Further, the controlling unit 22 always makes the output per channel (wavelength) remain constant on the basis of the information on the number of wavelengths. Note that a proper output value per channel may be set in the controlling unit 22 beforehand so that the controlling unit 22 controls the VOA 5 so as to make the output value. In relation to the output value, the controlling unit 22 performs a feedback operation of the output value information from the optical power monitoring unit 17, so as to control the VOA. Note that the reception of the information on the number of wavelengths can be effected by using the supervisory signal (SV light) with a wavelength different from that of the main signal on the basis of the wavelength-division-multiplexing transmission technology. FIG. 4 shows an exemplary configuration in which the information on the number of wavelengths is received from the SV light by a transmission-line-supervisory-signal detecting unit 27 branched from the transmission line. However, the reception of the information on the number of wavelengths is not limited to be performed by this configuration, but may be performed by any kind of means.

In the present embodiment, the optical amplifying apparatus 31 periodically receives the information on the number of wavelengths. Thereby, the controlling unit 22 controls the attenuation amount of the VOA so as to make the output per channel reach the target value (set value). However, it takes about several seconds to, when the time period is long, several tens seconds for the supervisory signal to be transferred from an apparatus in the preceding stage. Thereby, the controlling unit 22 controls the attenuation amount of the VOA similarly to the case of the first embodiment until it receives the information. Specifically, when an optical power variation occurs, the controlling unit 22 first determines whether the optical power variation is caused by the change in the number of wavelengths or by the variation of the transmission loss, on the basis of the optical power varying speed detected by the input-optical-power variation-detecting unit 18. Then, the controlling unit 22 selectively changes the control of the attenuation amount of the VOA on the basis of the determination. Thereafter, upon receipt of the information on the number of wavelengths transferred by the SV light, the controlling unit 22 reviews the control of the VOA on the basis of the information.

Specifically, once the optical power variation is determined to be caused by the change in the number of wavelengths on the basis of the detection of the optical power varying speed, and when the information on the number of wavelengths is updated after the control to make the attenuation amount of the VOA remain constant, the controlling unit 22 adjusts the control of the VOA so as to make the output-optical-power reach the output-target-value per channel. On the other hand, once the optical power variation is determined to be caused by the variation of the transmission loss on the basis of the detection of the optical power varying speed, and when the information on the number of wavelengths is updated after the control the VOA so as to make the output per channel remain constant, the controlling unit 22 also adjusts the control of the VOA so as to make the output-optical-power reach the output-target-value per channel.

Next, an operation of the second embodiment according to the present invention is explained by means of a flow chart.

Figure 5:
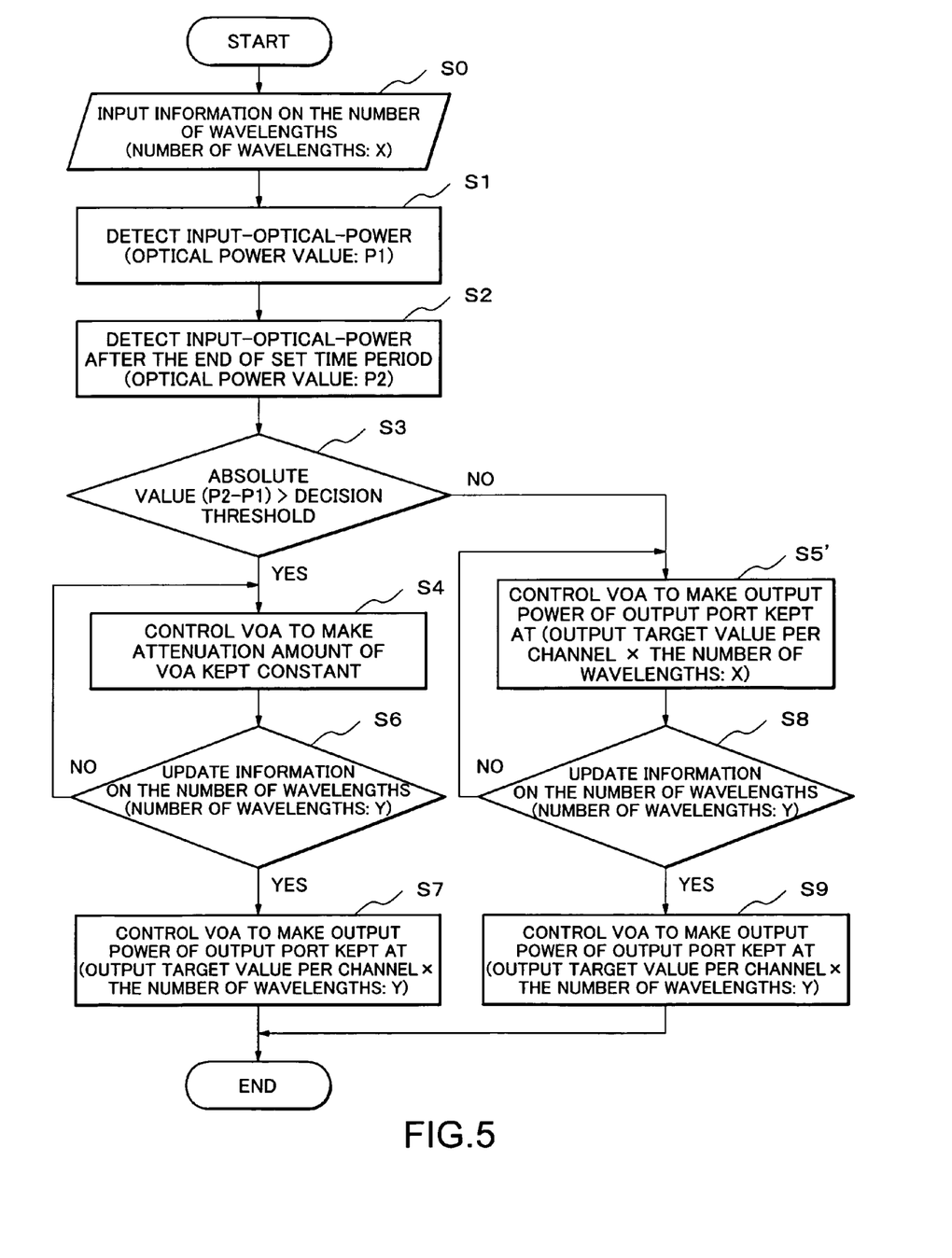
FIG. 5 is a flow chart showing an example of the control operation in the second embodiment according to the present invention.

FIG. 5 is a flow chart showing the control operation in the controlling unit 22. Note that in FIG. 5, steps equivalent to those in FIG. 3 are denoted by the same reference characters. Similarly to the first embodiment, after going to step S3, when the input-optical-power variation is larger than the decision threshold (set value) of the set optical power variation: "YES (varying speed is high)", the process proceeds to step S4. In step S4, the controlling unit 22 performs control to make the attenuation amount of the VOA 5 unchanged and remain constant. Thereafter, the controlling unit 22 receives the information on the number of wavelengths, and confirms the presence or absence of updated information (step 6). Then, when the information on the number of wavelengths is not updated (in the case of NO), the controlling unit 22 continues to perform the above described control operation. When the information on the number of wavelengths is updated (in the case of YES), the controlling unit 22 controls the attenuation amount of the VOA 5 to make the output power in the output port 2 reach the power of (the output-target-value per channel×the number of wavelengths) on the basis of the information (step S7). Note that the controlling unit 22 adjusts the output power in the output port 2 on the basis of the information from the optical power monitoring unit 17.

On the other hand, in the step S3, when the input-optical -power variation is not larger than the decision threshold: "NO (varying speed is low)", the process proceeds to step S5'. In step S5', the controlling unit 22 controls the attenuation amount of the VOA 5 so as to make the output power in the output port 2 reach the power of (the output-target-value per channel×the number of wavelengths: X), corresponding to the number of wavelengths (X) set beforehand. Thereafter, upon receipt of the information on the number of wavelengths which is updated ("YES" in step S8), the controlling unit 22 controls the attenuation amount of the VOA 5 so as to make the output power in the output port 2 reach the power of (the output-target-value per channel×the number of wavelengths: Y) (step S9), corresponding to the updated number of wavelengths (Y). Note that the controlling unit 22 similarly adjusts the output power in the output port 2 on the basis of the information from the optical power monitoring unit 17.

The second embodiment according to the present invention has the following effects in addition to those of the first embodiment.

In the second embodiment, the change in the number of wavelengths or the variation of the transmission loss is determined on the basis of the optical power varying speed, and thereafter the information on the number of wavelengths is further received, whereby the VOA can be more properly controlled. Specifically, even in the case where an erroneous determination tends to be made, such as in the case where the change in the number of wavelengths and the variation in the transmission loss occur at the same time, a more proper operation can be performed. Because the operation is performed by a synergistic effect of the quick determination based on the detection of the optical power varying speed and of the subsequent more accurate determination based on the reception of the information on the number of wavelengths. Further, the configuration according to the present embodiment is also effective in the case where the optical power varying speed very close to the decision threshold is detected. As described above, it takes much time to receive the information on the number of wavelengths. However, in the present embodiment, a quick determination is made on the basis of the optical power varying speed before the information on the number of wavelengths is received, and hence, needless to say, the operation to follow the optical power variation can be performed during this time period.

In the following, a modification of the above described embodiment is explained.

The controlling units 19, 20, 21 shown in the first embodiment (see FIG. 1) according to the present invention are shown by individual blocks. However, these blocks can also be constituted by one CPU (processor). Similarly, the controlling units 19, 20, 22 shown in the second embodiment (see FIG. 4) can also be constituted by one CPU. Then, the operation flow shown in FIG. 2, FIG. 3, FIG. 5 may be stored beforehand in a recording medium such as a ROM. Further, the operation flow stored beforehand may be read out and executed by the CPU.

The optical amplifying media 3, 4 are not limited to the EDF, but optical fibers doped with other material such as a praseodymium doped fiber (PDF), and an optical amplifier composed of a semiconductor may also be used for the optical amplifying media 3, 4. Further, the optical amplifying medium is not limited to be constituted by two stages, but may be constituted by a single stage or by more than two stages. Similarly, the VOA is not limited to be constituted by a single stage, but may be constituted by plural stages. Further, the VOA 5 is provided between the optical amplifying media 3, 4 in the example shown in FIG. 1. However, the VOA 5 may be provided for the head and the end of the plural optical amplifying media, or may be provided at an optional position. Further, an attenuator with various variable systems such as an optical type and a mechanical type can be used as the VOA. Further, the information on the number of wavelengths may not be obtained from the supervisory signal for transmission line, but may be transmitted from an apparatus in a preceding stage via a different route.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical transmission apparatus for amplifying and relaying a wavelength-division-multiplexed optical signal comprising:
   a variation-detecting unit which detects varying speed of input power of the wavelength-division-multiplexed optical signal and compares the varying speed with a set value;
   an optical amplifying unit which amplifies the wavelength-division-multiplexed optical signal at a fixed amount of amplification;
   a variable optical attenuating unit which variably attenuates the wavelength-division-multiplexed optical signal; and
   a controlling unit which controls attenuation amount of the variable optical attenuating unit in accordance with the varying speed.

2. The optical transmission apparatus according to claim 1, wherein the controlling unit does not change the attenuation amount of the variable optical attenuating unit, when the varying speed is higher than the set value, and
   wherein the controlling unit changes the attenuation amount of the variable optical attenuating unit, when the varying speed is lower than the set value.

3. The optical transmission apparatus according to claim 2, wherein when the varying speed is lower than the set value, the controlling unit changes the attenuation amount of the variable optical attenuating unit to make power of the wavelength-division-multiplexed optical signal outputted from the optical transmission apparatus kept constant.

4. The optical transmission apparatus according to claim 2, wherein when the varying speed is lower than the set value, the controlling unit changes the attenuation amount of the variable optical attenuating unit to make power of the optical signal per wavelength outputted from the optical transmission apparatus kept at an output-target-value.

5. The optical transmission apparatus according to claim 2, wherein the controlling unit further receives information on the number of wavelengths, and when the varying speed is higher than the set value, the controlling unit controls the attenuation amount of the variable optical attenuating unit to make outputted power of the optical signal per wavelength kept constant on the basis of the information on the number of wavelengths.

6. The optical transmission apparatus according to claim 2, wherein the controlling unit further receives information on the number of wavelengths, and when the varying speed is higher than the set value, the controlling unit controls the attenuation amount of the variable optical attenuating unit to make outputted power of the optical signal per wavelength kept at a target value on the basis of the information on the number of wavelengths.

7. The optical transmission apparatus according to claim 2, wherein the controlling unit further receives information on the number of wavelengths, and when the varying speed is lower than the set value, the controlling unit controls the attenuation amount of the variable optical attenuating unit to make outputted power of the optical signal per wavelength kept constant on the basis of the information on the number of wavelengths.

8. The optical transmission apparatus according to claim 2, wherein the controlling unit further receives information on the number of wavelengths, and when the varying speed is lower than the set value, the controlling unit controls the attenuation amount of the variable optical attenuating unit to make outputted power of the optical signal per wavelength kept at a target value on the basis of the information on the number of wavelengths.

9. The optical transmission apparatus according to claim 1, wherein the varying speed is calculated from a varying amount of input power of the wavelength-division-multiplexed optical signal within a set time period.

10. The optical transmission apparatus according to claim 9, wherein the set time period is several hundreds ms or less.

11. The optical transmission apparatus according to claim 1, wherein the variation-detecting unit comprises:
    an analog/digital converter which performs analog/digital conversion of the input power of the wavelength-division-multiplexed optical signal;
    a registering unit which successively stores the digital conversion value at each specified period; and
    a comparing unit which calculates the varying speed from a varying amount of the digital conversion value within the set time period, and compares the varying speed with the set value.

12. The optical transmission apparatus according to claim 11, wherein the variation-detecting unit is constituted by a processor.

13. The optical transmission apparatus according to claim 12, wherein the variation-detecting unit and the controlling unit are constituted by one processor.

14. The optical transmission apparatus according to claim 1, wherein the variation-detecting unit is constituted by a differential detector provided with a circuit having a differentiating function.

15. The optical transmission apparatus according to claim 1, wherein the set value is a change of 1 dB within several hundreds ms.

16. The optical transmission apparatus according to claim 1, wherein the controlling unit further receives information on the number of wavelengths, and controls the attenuation amount of the variable optical attenuating unit on the basis of the information on the number of wavelengths.

17. An optical transmission apparatus for amplifying and relaying a wavelength-division-multiplexed optical signal comprising:
    varying speed detecting means which detects varying speed of input power of the wavelength-division-multiplexed optical signal and compares the varying speed with a set value;
    optical amplifying means which amplifies the wavelength-division-multiplexed optical signal at a fixed amount of amplification;
    variable optical attenuating means which variably attenuates the wavelength-division-multiplexed optical signal; and
    cotrolling means which controls attenuation amount of the variable optical attenuating means in accordance with the varying speed.

18. The optical transmission apparatus according to claim 17, wherein the controlling means does not change the attenuation amount of the variable optical attenuating means, when the varying speed is higher than the set value, and wherein the controlling means changes the attenuation amount of the variable optical attenuating means, when the varying speed is lower than the set value.

19. The optical transmission apparatus according to claim 18,
wherein when the varying speed is lower than the set value, the controlling means changes the attenuation amount of the variable optical attenuating means to make power of the wavelength-division-multiplexed optical signal outputted from the optical transmission apparatus kept constant.

20. The optical transmission apparatus, according to claim 18,
wherein when the varying speed is lower than the set value, the controlling means changes the attenuation amount of the variable optical attenuating means to make power of optical signal per wavelength outputted from the optical transmission apparatus kept at an output-target-value.

21. The optical transmission apparatus according to claim 17,
wherein the varying speed is calculated from a varying amount of the input power of the wavelength-division-multiplexed optical signal within a set time period.

22. The optical transmission apparatus according to claim 21,
wherein the set time period is several hundreds ms or less.

23. An optical transmission control method of amplifying and relaying a wavelength-division-multiplexed optical signal comprising:
detecting varying speed of input power of the wavelength-division-multiplexed optical signal;
comparing the varying speed with a set value;
amplifying the wavelength-division-multiplexed optical signal at a fixed amount of amplification; and
attenuating the wavelength-division-multiplexed optical signal constantly or variably in accordance with the varying speed.

24. The optical transmission control method according to claim 23, further comprising:
constantly attenuating the wavelength-division-multiplexed optical signal when the varying speed is higher than the set value; and
variably attenuating the wavelength-division-multiplexed optical signal when the varying speed is lower than the set value.

25. The optical transmission control method according to claim 24,
wherein the wavelength-division-multiplexed optical signal is variably attenuated to make output power of the wavelength-division-multiplexed optical signal kept constant, when the varying speed is lower than the set value.

26. The optical transmission control method according to claim 24,
wherein the wavelength-division-multiplexed optical signal is variably attenuated to make output power of the wavelength-division-multiplexed optical signal per wavelength at an output-target-value, when the varying speed is lower than the set value.

27. The optical transmission control method according to claim 23,
wherein the varying speed is calculated from a varying amount of the input power of the wavelength-division-multiplexed optical signal within a set time period.

28. The optical transmission control method according to claim 27,
wherein the set time period is several hundreds ms or less.

29. The optical transmission control method according to claim 23, further comprising:
performing analog/digital conversion of the input power of the wavelength-division-multiplexed optical signal;
successively storing the digital conversion value at each specified period; and
calculating the varying speed from a varying amount of the digital conversion value within the set time period, and comparing the varying speed with the set value.

30. The optical transmission control method according to claim 29,
wherein the steps are performed by a processor.

31. The optical transmission control method according to claim 29,
wherein the steps are performed by a differential detector provided with a circuit having a differentiating function.

32. The optical transmission control method according to claim 23,
wherein the set value is a change of 1 dB within several hundreds ms.

33. The optical transmission control method according to claim 23, further comprising:
receiving information on the number of wavelengths; and
variably attenuating the wavelength-division-multiplexed optical signal on the basis of the information on the number of wavelengths.

34. The optical transmission control method according to claim 33,
wherein the wavelength-division-multiplexed optical signal is attenuated to make outputted power of the optical signal per wavelength kept constant on the basis of the information on the number of wavelengths, when the varying speed is higher than the set value.

35. The optical transmission control method according to claim 33,
wherein the wavelength-division-multiplexed optical signal is attenuated to make outputted power of the optical signal per wavelength kept at a target value on the basis of the information on the number of wavelengths, when the varying speed is higher than the set value.

36. The optical transmission control method according to claim 33,
wherein the wavelength-division-multiplexed optical signal is attenuated to make outputted power of the optical signal per wavelength kept constant on the basis of the information on the number of wavelengths, when the varying speed is lower than the set value.

37. The optical transmission control method according to claim 33,
wherein attenuating the wavelength-division-multiplexed optical signal is attenuated to make outputted power of the optical signal per wavelength kept at a target value on the basis of the information on the number of wavelengths, when the varying speed is lower than the set value.

* * * * *